(12) United States Patent
Jung et al.

(10) Patent No.: US 12,222,525 B2
(45) Date of Patent: Feb. 11, 2025

(54) CAMERA MODULE

(71) Applicant: LG INNOTEK CO., LTD., Seoul (KR)

(72) Inventors: Tae Jin Jung, Seoul (KR); Sang Jun Min, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 765 days.

(21) Appl. No.: 17/419,135

(22) PCT Filed: Dec. 27, 2019

(86) PCT No.: PCT/KR2019/018610
§ 371 (c)(1),
(2) Date: Jun. 28, 2021

(87) PCT Pub. No.: WO2020/139024
PCT Pub. Date: Jul. 2, 2020

(65) Prior Publication Data
US 2022/0113456 A1    Apr. 14, 2022

(30) Foreign Application Priority Data
Dec. 28, 2018  (KR) .................. 10-2018-0172577

(51) Int. Cl.
*G02B 3/14*     (2006.01)
*G02B 13/00*    (2006.01)
(Continued)

(52) U.S. Cl.
CPC ........... *G02B 3/14* (2013.01); *G02B 13/0075* (2013.01); *G02B 26/005* (2013.01);
(Continued)

(58) Field of Classification Search
CPC ........ G02B 3/12; G02B 3/14; G02B 13/0075; G02B 26/004; G02B 26/005; G02B 2207/115
See application file for complete search history.

(56) References Cited

U.S. PATENT DOCUMENTS

2011/0038028 A1*  2/2011  Dharmatilleke ......... G02B 5/06
                                                         359/290
2014/0355120 A1*  12/2014  Yeo ...................... G02B 27/646
                                                         359/557
(Continued)

FOREIGN PATENT DOCUMENTS

CN    207473171 U    6/2018
KR    10-0843473 B1  7/2008
(Continued)

OTHER PUBLICATIONS

Office Action dated Oct. 25, 2023 in Korean Application No. 10-2018-0172577.
(Continued)

*Primary Examiner* — Cara E Rakowski
(74) *Attorney, Agent, or Firm* — Saliwanchik, Lloyd & Eisenschenk

(57) ABSTRACT

The present exemplary embodiment relates to a camera module comprising: a housing; a liquid lens disposed in the housing; a magnet disposed in the housing; a base disposed and spaced apart from the housing; a substrate comprising a coil facing the magnet and disposed on the base; a plurality of wires connected to the housing and the substrate; and a connection part connecting the liquid lens and at least one wire of the plurality of wires, wherein the liquid lens and the substrate are electrically connected to each other through the connection part and the at least one wire.

15 Claims, 10 Drawing Sheets

(51) Int. Cl.
*G02B 26/00* (2006.01)
*G02B 27/64* (2006.01)
*G03B 5/00* (2021.01)
*G03B 13/36* (2021.01)

(52) U.S. Cl.
CPC ............ *G02B 27/646* (2013.01); *G03B 5/00* (2013.01); *G03B 13/36* (2013.01); *G02B 2207/115* (2013.01); *G03B 2205/0007* (2013.01)

(56) References Cited

U.S. PATENT DOCUMENTS

| | | | |
|---|---|---|---|
| 2016/0274375 A1* | 9/2016 | Park | H02K 33/18 |
| 2017/0054883 A1 | 2/2017 | Sharma et al. | |
| 2017/0082827 A1* | 3/2017 | Park | G02B 7/08 |
| 2019/0230261 A1* | 7/2019 | Hu | G03B 9/04 |
| 2019/0250312 A1* | 8/2019 | Moon | G03B 3/10 |

FOREIGN PATENT DOCUMENTS

| | | |
|---|---|---|
| KR | 10-2015-0142196 A | 12/2015 |
| KR | 10-2016-0053465 A | 5/2016 |
| KR | 10-2016-0060219 A | 5/2016 |
| KR | 10-2017-0034640 A | 3/2017 |
| KR | 10-2018-0088237 A | 8/2018 |
| WO | 2010/123920 A2 | 10/2010 |
| WO | 2018/052228 A1 | 3/2018 |

OTHER PUBLICATIONS

International Search Report dated Apr. 14, 2020 in International Application No. PCT/KR2019/018610.

Office Action dated Dec. 29, 2023 in Taiwanese Application No. 108148378.

* cited by examiner

CAMERA MODULE

CROSS-REFERENCE TO RELATED APPLICATIONS

This application is the U.S. national stage application of International Patent Application No. PCT/KR2019/018610, filed Dec. 27, 2019, which claims the benefit under 35 U.S.C. § 119 of Korean Application No. 10-2018-0172577, filed Dec. 28, 2018, the disclosures of each of which are incorporated herein by reference in their entirety.

TECHNICAL FIELD

The present exemplary embodiment relates to a camera module.

BACKGROUND ART

The following description provides background information for the present exemplary embodiment and does not describe the prior art.

As various portable terminals are widely spread and commonly used, and the wireless Internet services have been commercialized, the demands of consumers related to portable terminals have been diversified and various kinds of additional devices have been installed in portable terminals.

Among them, there is a camera module for photographing a subject as a photograph or a moving picture. Meanwhile, in recent camera modules, an autofocus function that automatically adjusts focus according to the distance of a subject is applied. In addition, an image stabilization function that inhibits an image from shaking caused by the hand shaking of a photographer has been applied.

However, if both the autofocus function and the image stabilization function are to be performed through the liquid lens module, there is a problem that it is difficult to perform perfectly both the autofocus function and the image stabilization function due to the nature of the liquid lens, which requires consideration of external factors such as temperature and the effects of gravity.

DETAILED DESCRIPTION OF THE INVENTION

Technical Subject

The present exemplary embodiment is to provide a camera module that performs an autofocus function through a liquid lens module, and implements an image stabilization function mechanically.

Technical Solution

The camera module according to the present exemplary embodiment may comprise: a housing; a liquid lens disposed in the housing; a magnet disposed in the housing; a base disposed and spaced apart from the housing; a substrate comprising a coil facing the magnet and disposed on the base; a plurality of wires connected to the housing and the substrate; and a connection part connecting the liquid lens and at least one wire of the plurality of wires, wherein the liquid lens and the substrate may be electrically connected to each other through the connection part and the at least one wire.

The connection part may comprise a conductive line disposed on one surface of the housing, one end portion of the conductive line may be connected to a terminal of the liquid lens, and the other end portion of the conductive line may be connected to the wire.

The liquid lens may comprise a first terminal and a second terminal, wherein the plurality of wires may comprise a first wire connected to the first terminal of the liquid lens and a second wire connected to the second terminal of the liquid lens.

The housing may comprise: a first lateral wall; a second lateral wall disposed opposite the first lateral wall; and a third lateral wall and a fourth lateral wall disposed opposite to each other between the first lateral wall and the second lateral wall, wherein the magnet may comprise: a first magnet disposed on the first lateral wall; a second magnet disposed on the second lateral wall; a third magnet disposed on the third lateral wall; and a fourth magnet disposed on the fourth lateral wall; and wherein the coil of the substrate may comprise: a first coil facing the first magnet; a second coil facing the second magnet; a third coil facing the third magnet; and a fourth coil facing the fourth magnet.

The camera module may further comprise: a first Hall sensor disposed on the substrate and facing the first magnet or the second magnet; and a second Hall sensor disposed on the substrate and facing the third magnet or the fourth magnet, wherein the substrate may comprise a plurality of terminals, and wherein the plurality of terminals of the substrate may comprise: a terminal electrically connected to the liquid lens; a terminal electrically connected to the first coil and the second coil; a terminal electrically connected to the third coil and the fourth coil; a terminal electrically connected to the first Hall sensor; and a terminal electrically connected to the second Hall sensor.

The housing may comprise: a first lateral wall; a second lateral wall disposed opposite to the first lateral wall; and a third lateral wall and a fourth lateral wall disposed opposite to each other between the first lateral wall and the second lateral wall, wherein the magnet may comprise: a first magnet disposed at a first corner where the first lateral wall and the third lateral wall meet; a second magnet disposed at a second corner where the first lateral wall and the fourth lateral wall meet; a third magnet disposed at a third corner where the second lateral wall and the fourth lateral wall meet; and a fourth magnet disposed in a fourth corner where the second lateral wall and the third lateral wall meet each other, and wherein the coil of the substrate may comprise: a first coil facing the first magnet; a second coil facing the second magnet; a third coil facing the third magnet; and a fourth coil facing the fourth magnet.

The conductive line may be printed or formed in a line shape on the surface of the housing, and the conductive line and the terminal of the liquid lens, the conductive line and the wire may be connected by any one or more of conductive epoxy and solder balls.

The camera module may further comprise: an upper plate comprising a hole; and a cover comprising a lateral plate extending from the upper plate and coupled to the base, wherein the cover and the base may form a space to be disposed with the housing.

The connection part may be formed on the surface of the housing as a conductive line.

The plurality of terminals of the substrate may comprise: a total of fourteen terminals, wherein the fourteen terminals may comprise: two terminals electrically connected to the liquid lens; two terminals electrically connected to the first coil and the second coil; two terminals electrically connected to the third coil and the fourth coil; four terminals electrically connected to the first Hall sensor; and four terminals electrically connected to the second Hall sensor The camera module may further comprise a holder disposed between the housing and the liquid lens, wherein the liquid lens may comprise a first electrode formed on an upper surface of the liquid lens and a second electrode formed on a lower surface of the liquid lens, and wherein the holder may be provided with a first terminal connecting the first electrode and the connecting part, and a second terminal connecting the second electrode and the connection part.

The camera module according to the present exemplary embodiment may comprise: a housing; a liquid lens disposed in the housing; a magnet disposed in the housing; a base disposed and spaced apart from the housing; a substrate comprising a coil facing the magnet and disposed on the base; a plurality of plate springs connected to the housing and the base; and a connection portion connecting the liquid lens and at least one plate spring of the plurality of plate springs, wherein the liquid lens and the substrate may be electrically connected to the connection portion through the at least one plate spring.

The liquid lens may comprise a plurality of terminals, and the connection portion may be formed in a number corresponding to the plurality of terminals.

The camera module according to the present exemplary embodiment may comprise: a housing; a first liquid lens disposed in the housing; a second liquid lens spaced apart from the first liquid lens; a magnet disposed in the housing; a substrate comprising a coil facing the magnet and spaced apart from the housing; a plurality of support members connecting the housing and the substrate; a first connector connecting the first liquid lens and a first support member among the plurality of support members; and a second connection part connecting the second liquid lens and a second support member among the plurality of support members, wherein the first liquid lens and the substrate may be electrically connected through the first connecting portion and the first support member, and the second liquid lens and the substrate may be electrically connected through the second connection part and the second support member.

Advantageous Effects

According to the present exemplary embodiment, the image stabilization function may be further realized for the camera module comprising a liquid lens module which performs only the auto focus function.

BEST MODE

Figure 1:
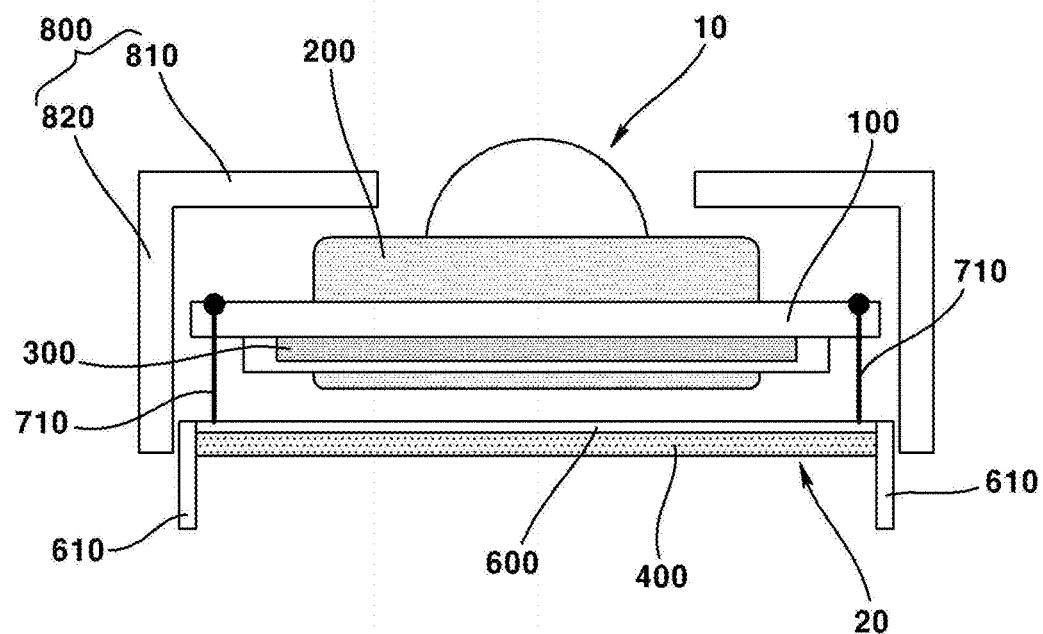
FIG. 1 is a cross-sectional view (conceptual view) of a camera module according to a first exemplary embodiment of the present invention.

Hereinafter, some embodiments of the present invention will be described with reference to exemplary drawings. However, the technical idea of the present invention is not limited to the some embodiments described.

In describing the components of the embodiment of the present invention, terms such as first, second, A, B, (a), and (b) may be used. These terms are merely intended to distinguish the components from other components, and the terms do not limit the nature, order or sequence of the components.

When a component is described as being 'connected", "coupled", or "jointed" to another component, the component may be directly connected, coupled, or jointed to the other component, however, it should be understood that another element may be "connected", "coupled" or "jointed" between components.

The "optical axis direction" used below is defined as the optical axis direction of the lens module in a state coupled to the lens driving apparatus. On the other hand, the "optical direction" may be used interchangeably with the "up and down direction", "vertical direction", "z-axis direction" and the like.

The "auto focus function" used below is defined as the function that automatically focuses on the subject by moving the lens in the direction of the optical axis according to the distance of the subject so that clear images of the subject can be obtained on the image sensor. Meanwhile, 'auto focus' can be used interchangeably with 'AF (Auto Focus)'.

The "image stabilization function" used below is defined as a function of moving or tilting a lens module in a direction perpendicular to the optical axis direction so as to cancel a vibration (movement) generated in an image sensor by an external force. Meanwhile, "image stabilization" may be used interchangeably with "OIS (Optical Image Stabilization)".

Hereinafter, the configuration of an optical apparatus according to the present exemplary embodiment will be described.

The optical apparatus may be any one of a mobile phone, a mobile phone, a smart phone, a portable smart device, a digital camera, a laptop computer, a digital broadcasting terminal, a personal digital assistant (PDA), a portable multimedia player (PMP), and a navigation device. However, the type of the optical apparatus is not limited thereto, and any device for capturing an image or a picture may be included in the optical apparatus.

The optical apparatus may comprise a main body. The main body may form the appearance of the optical apparatus. The main body may accommodate a camera module. A display unit may be disposed on one surface of the main body. For example, the display unit and the camera module may be disposed on one surface of the main body, and another camera module may be additionally disposed on the other surface (a surface opposite to the one surface) of the main body.

The optical apparatus may comprise a display unit. The display unit may be disposed on one surface of the main body. The display unit may output an image captured by the camera module.

The optical apparatus may comprise a camera module. The camera module may be disposed in the main body. At least a portion of the camera module may be accommodated in the main body. The camera module may be provided in plurality. The camera module may be disposed respectively on one surface of the main body and the other surface of the main body. The camera module may capture an image of a subject.

Hereinafter, the configuration of the camera module according to the first to fourth exemplary embodiments and modified examples thereof will be described with reference to the drawings.

Figure 2:
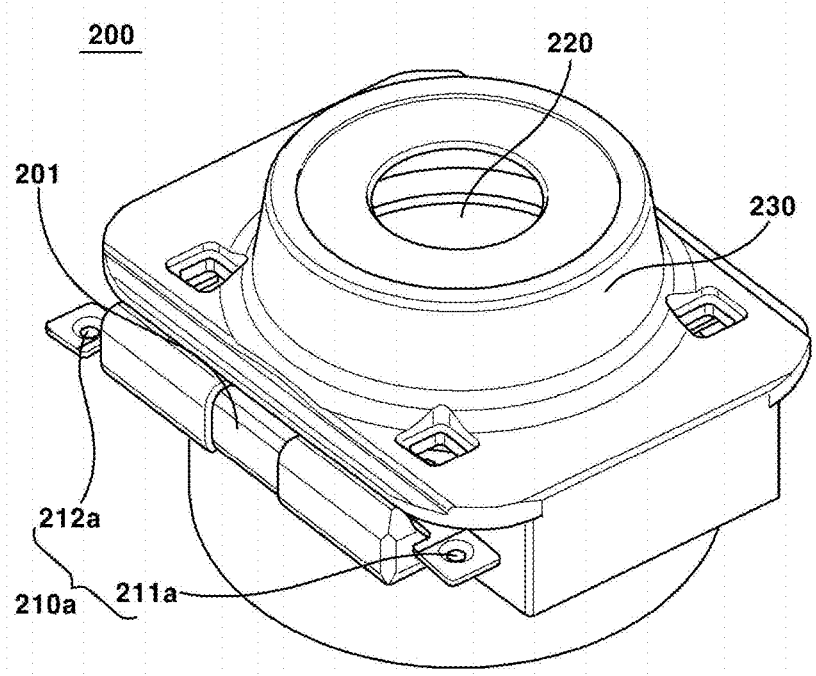
FIG. 2 is a perspective view of a liquid lens module of a camera module according to a modified example of the first exemplary embodiment of the present invention.
Figure 3A:
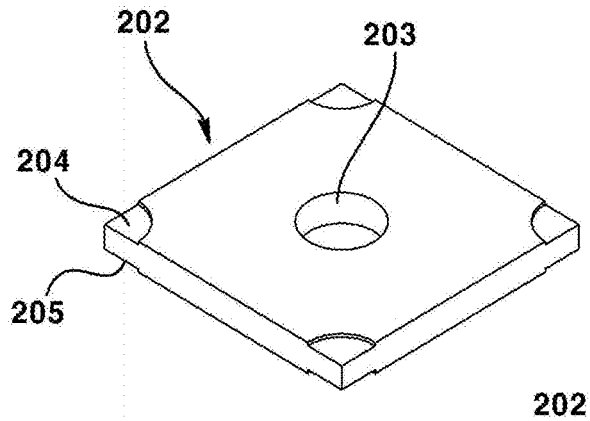
FIG. 3(*a*) is a perspective view and FIG. 3(*b*) is an equivalent circuit of the liquid lens of the camera module according to the first exemplary embodiment of the present invention.
Figure 4:
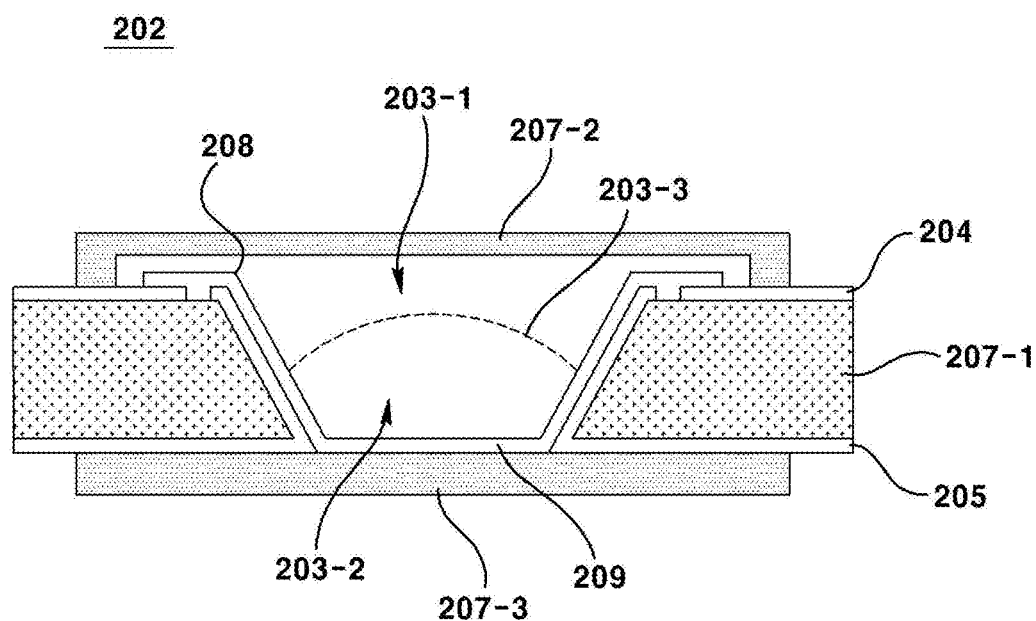
FIG. 4 is a cross-sectional view of the liquid lens of the camera module according to the first exemplary embodiment of the present invention.
Figure 5:
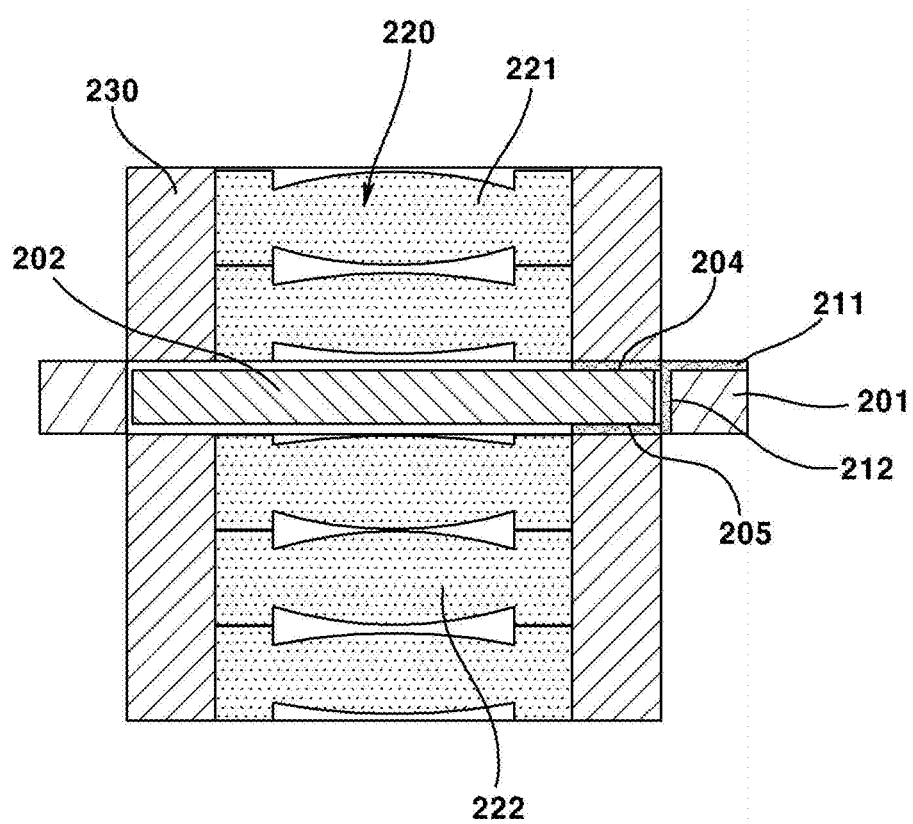
FIG. 5 is a cross-sectional view (conceptual view) of the liquid lens module of the camera module according to the first exemplary embodiment of the present invention.
Figure 6:
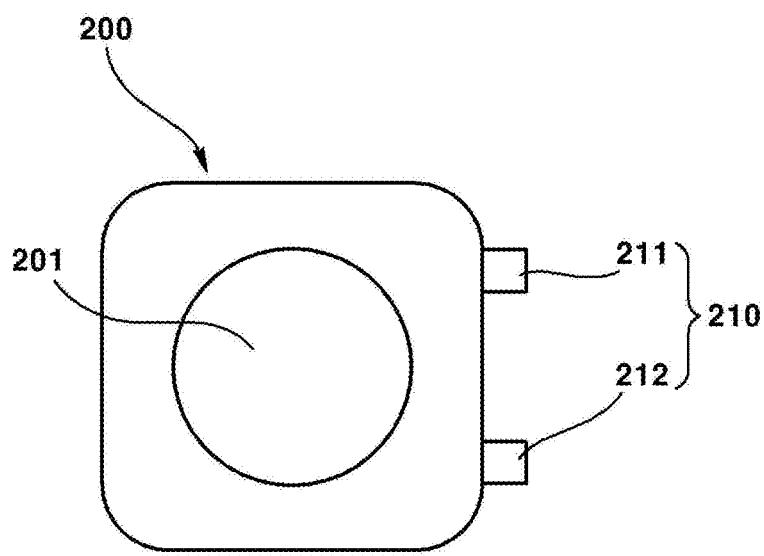
FIG. 6 is a plan view (conceptual view) of the liquid lens module of the camera module according to the first exemplary embodiment of the present invention.
Figure 7:
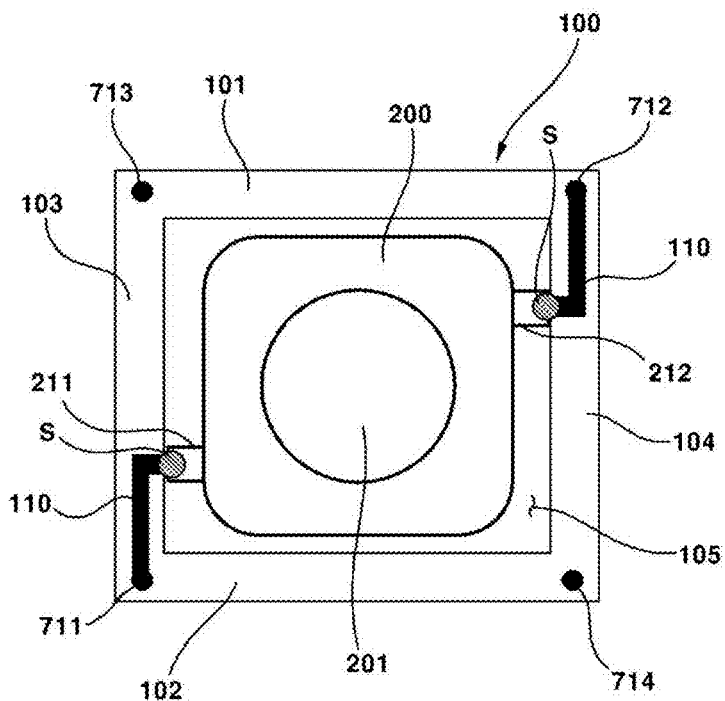
FIG. 7 is a plan view (conceptual diagram) illustrating some modified examples and related configurations of the liquid lens module of FIG. 6.
Figure 8:
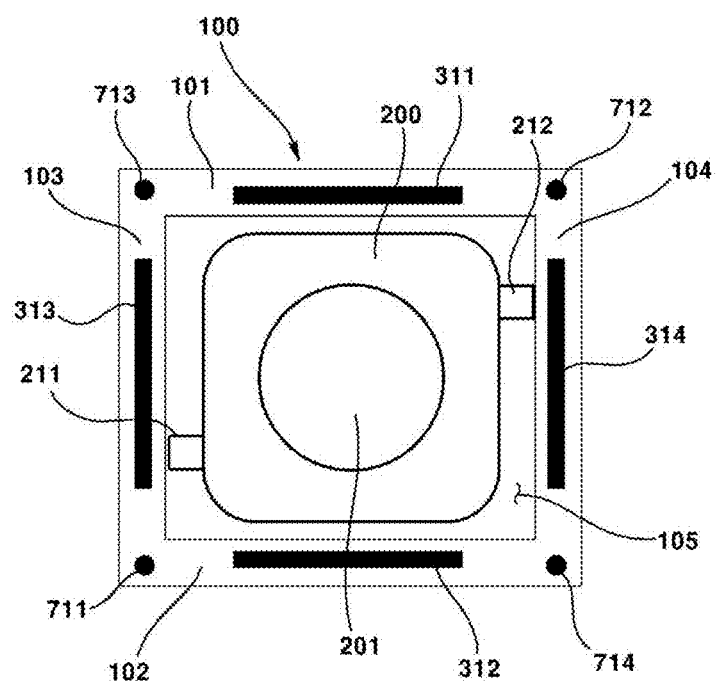
FIG. 8 is a bottom view (conceptual view) of the configuration illustrated in FIG. 7.
Figure 9:
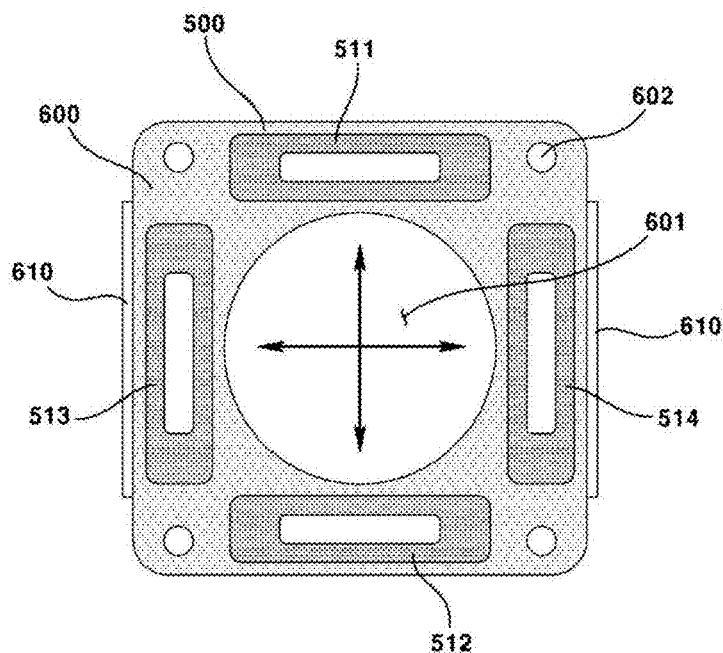
FIG. 9 is a plan view (conceptual diagram) illustrating a coil and a related configuration of a camera module according to the first exemplary embodiment of the present invention.
Figure 10:
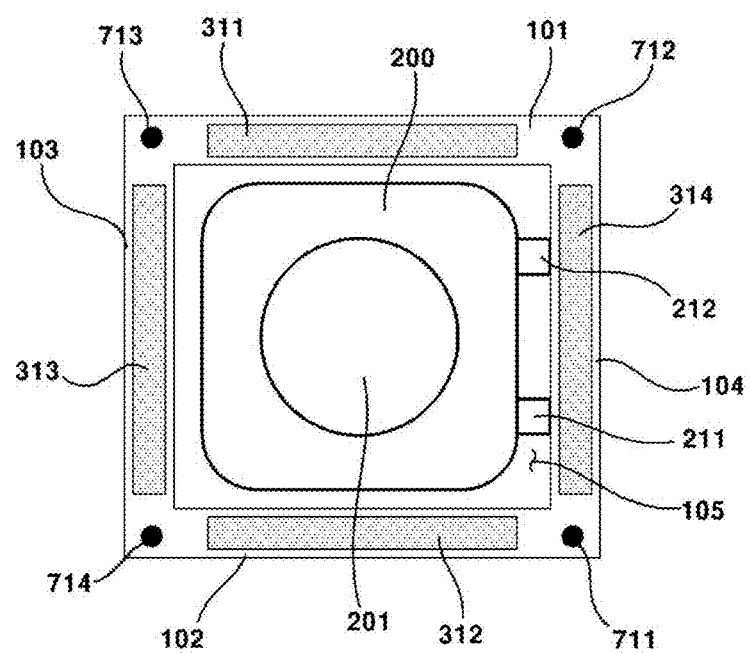
FIG. 10 is a bottom view (conceptual view) illustrating a magnet facing the coil of FIG. 9 and a related configuration.
Figure 11:
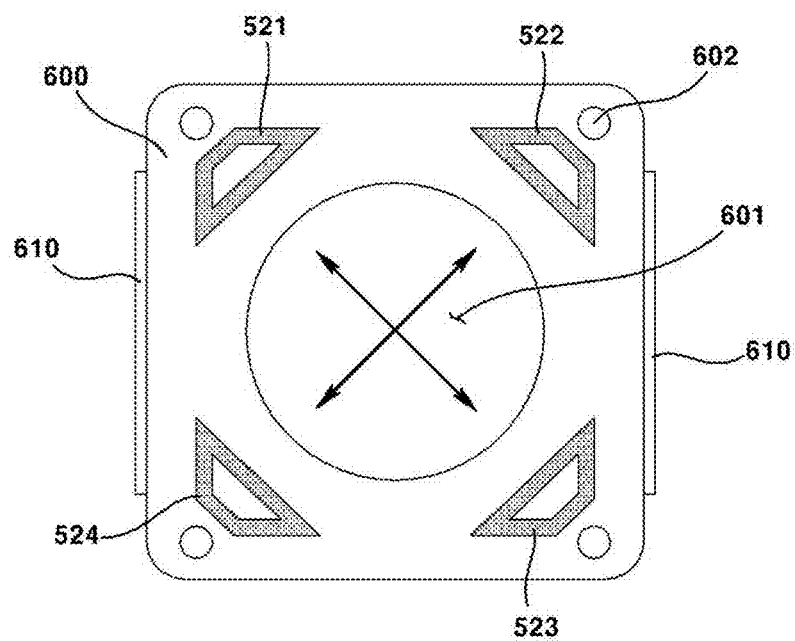
FIG. 11 is a plan view (conceptual diagram) illustrating a modified example and the related configuration of the coil of FIG. 9.
Figure 12:
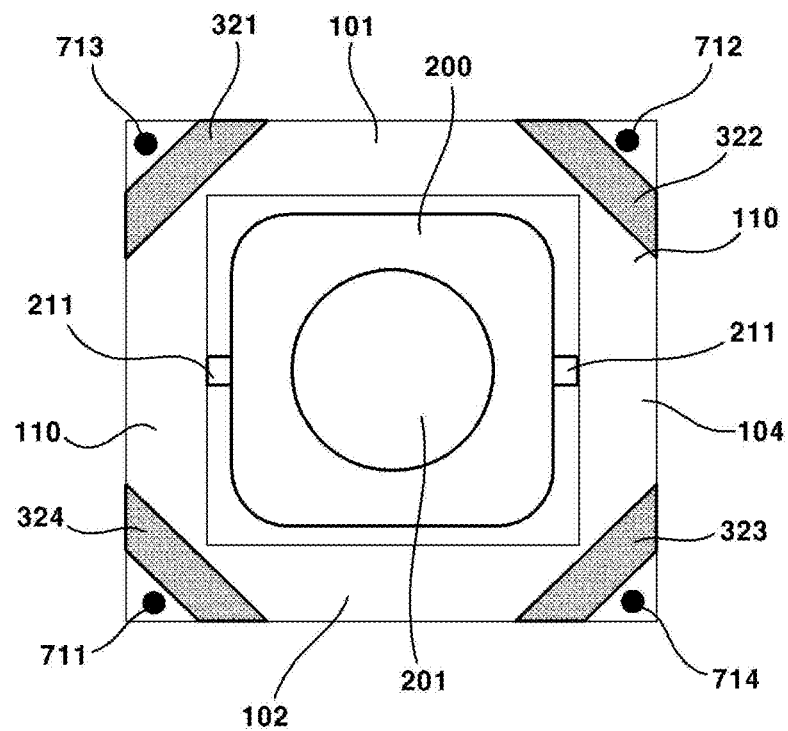
FIG. 12 is a bottom view (conceptual view) illustrating a magnet facing the coil of FIG. 11 and a related configuration.
Figure 13:
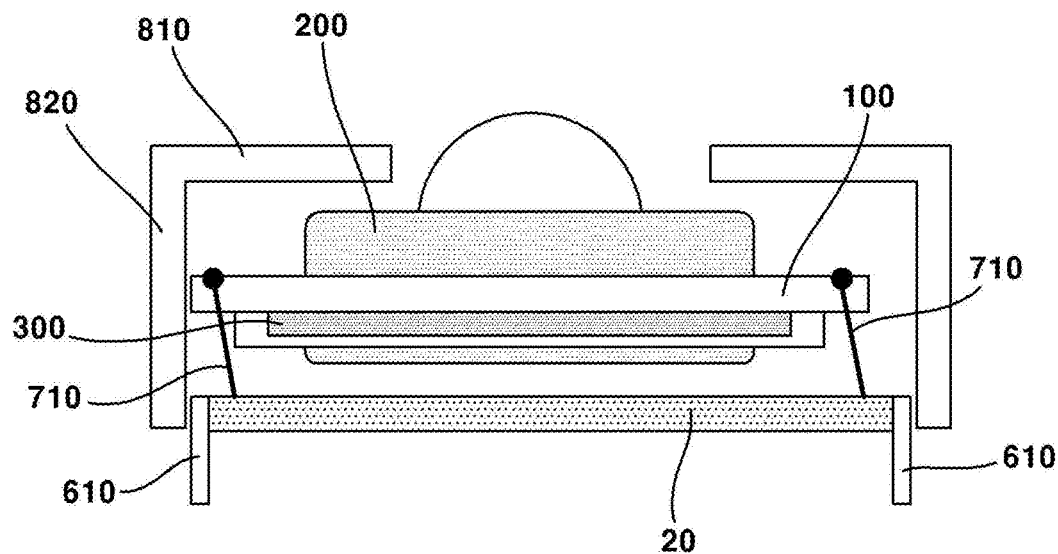
FIG. 13 is a cross-sectional view (conceptual diagram) illustrating an operating state of the camera module of FIG. 1.
Figure 14:
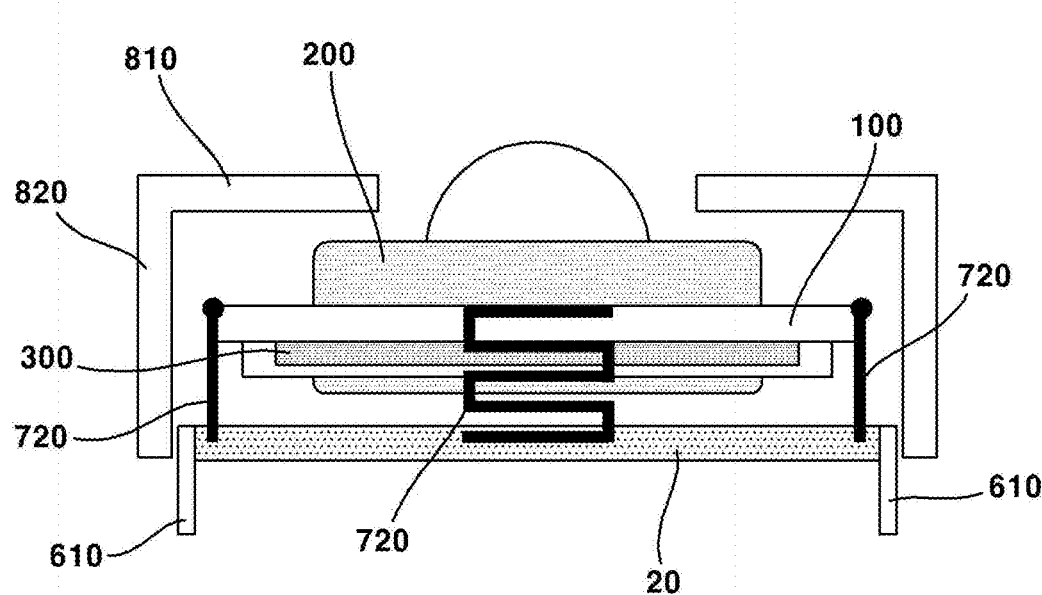
FIG. 14 is a cross-sectional view (conceptual view) of a camera module according to a second exemplary embodiment of the present invention.
Figure 15:
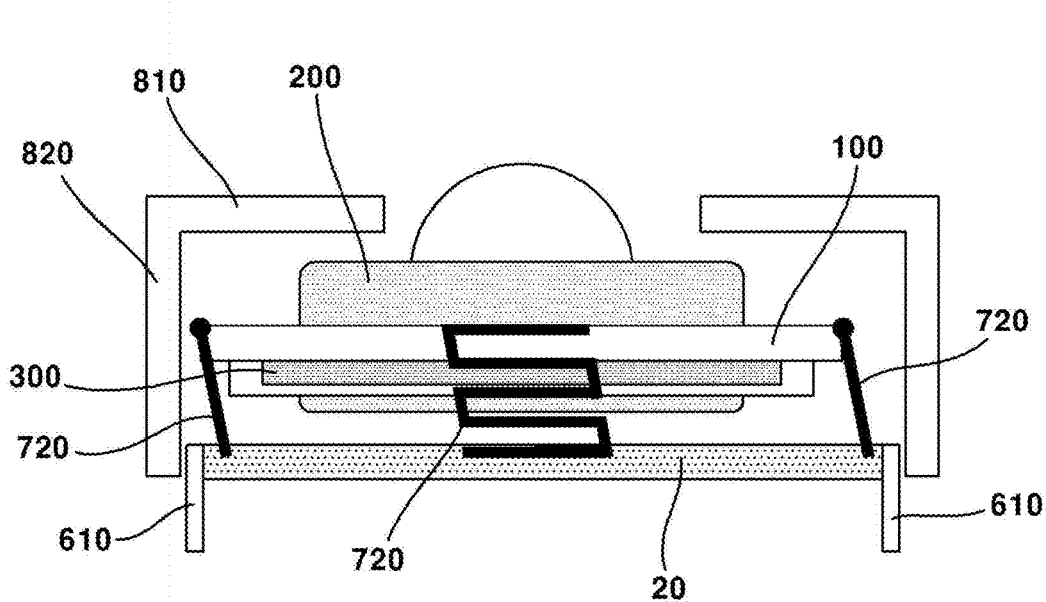
FIG. 15 is a cross-sectional view (conceptual diagram) illustrating an operating state of the camera module of FIG. 14.
Figure 16:
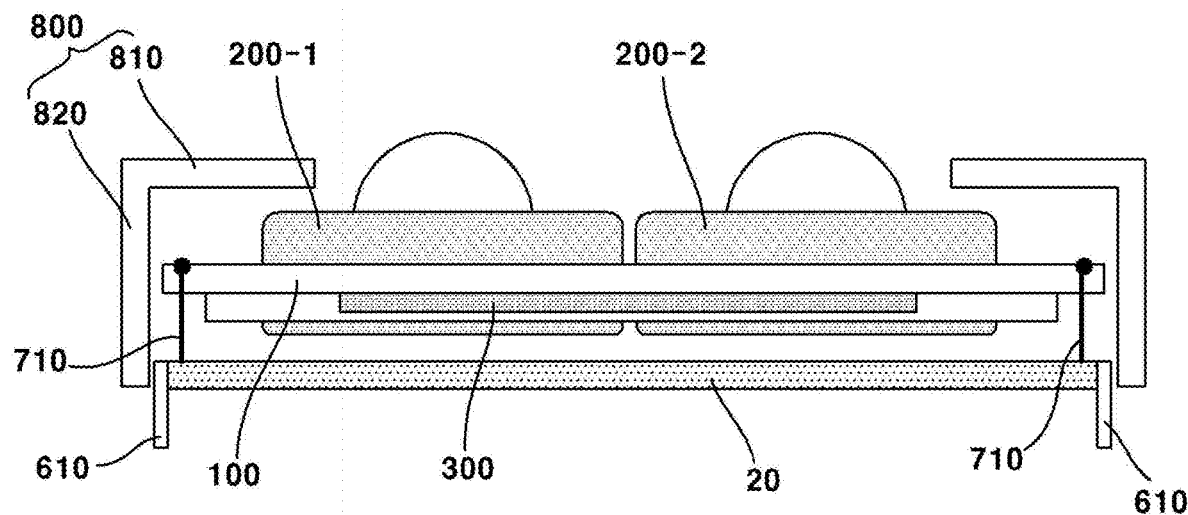
FIG. 16 is a cross-sectional view (conceptual view) of a camera module according to a third embodiment of the present invention.
Figure 17:
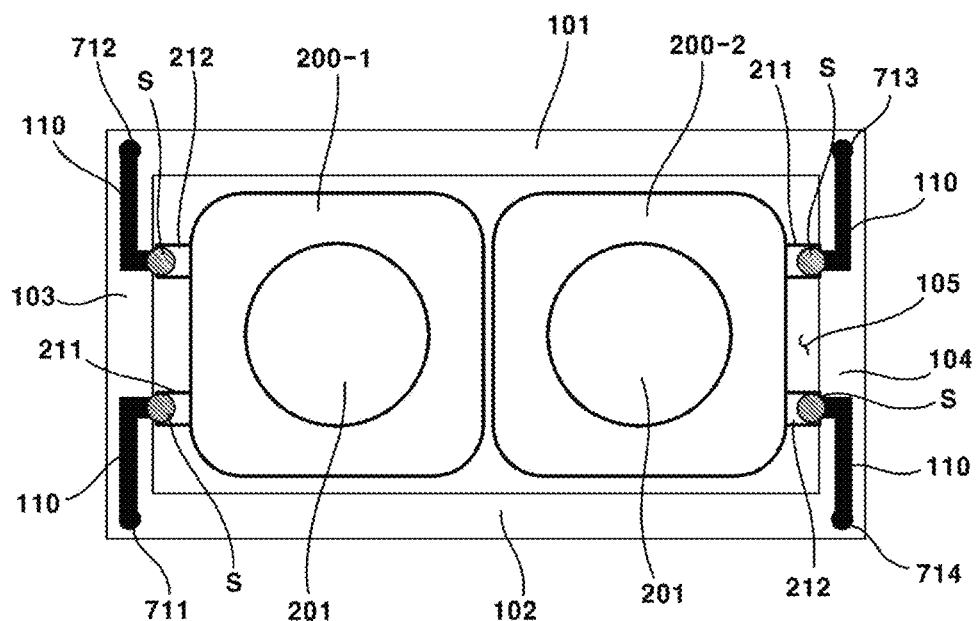
FIG. 17 is a plan view (conceptual diagram) illustrating a partial configuration of the camera module of FIG. 16.
Figure 18:
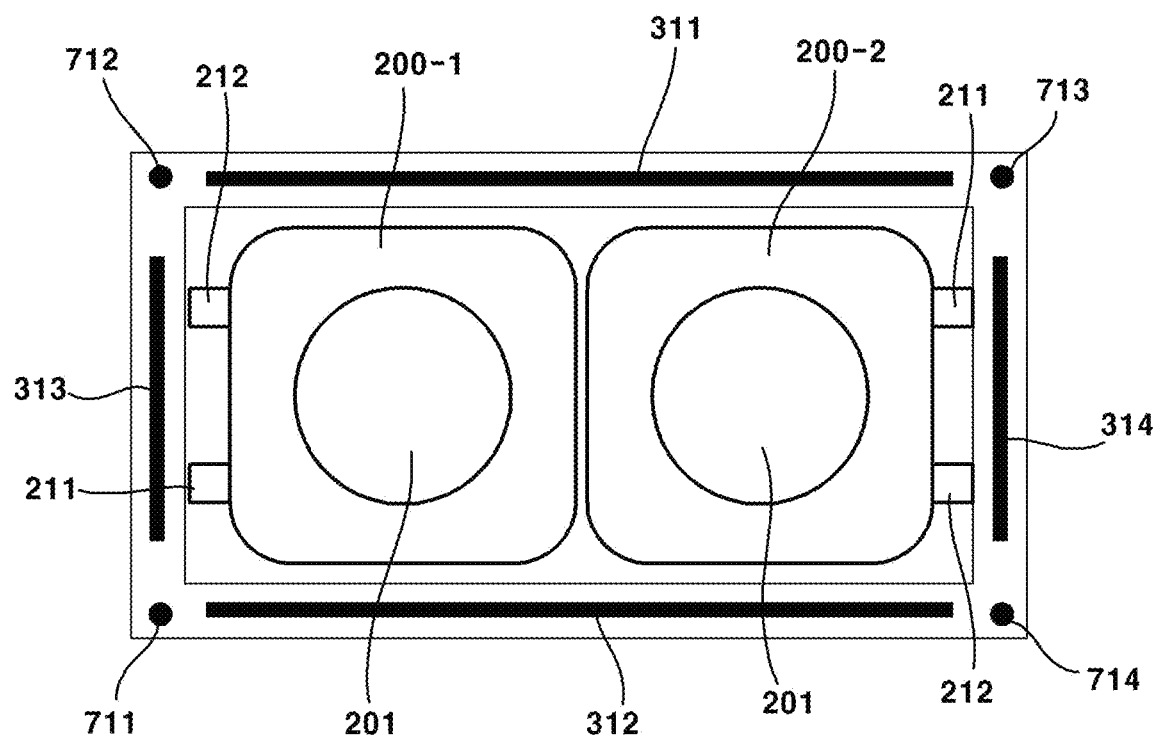
FIG. 18 is a bottom view (conceptual view) of the configuration illustrated in FIG. 17.
Figure 19:
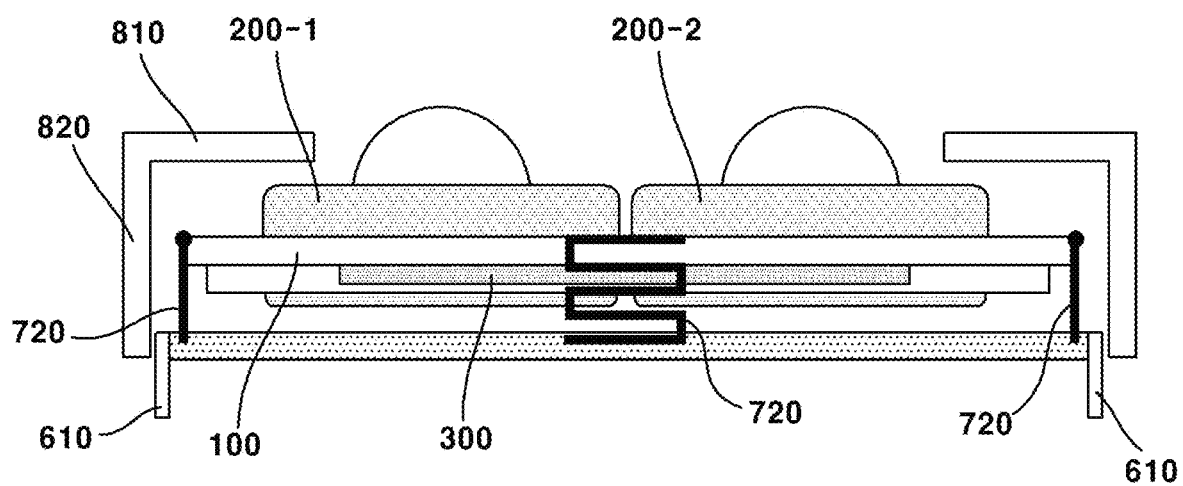
FIG. 19 is a cross-sectional view (conceptual view) of a camera module according to a fourth embodiment of the present invention.

FIG. 1 is a cross-sectional view (conceptual view) of a camera module according to a first exemplary embodiment of the present invention; FIG. 2 is a perspective view of a liquid lens module of a camera module according to a modified example of the first exemplary embodiment of the present invention; FIG. 3(*a*) is a perspective view and FIG. 3(*b*) is an equivalent circuit (b) of the liquid lens of the camera module according to the first exemplary embodiment of the present invention; FIG. 4 is a cross-sectional view of the liquid lens of the camera module according to the first exemplary embodiment of the present invention; FIG. 5 is a cross-sectional view (conceptual view) of the liquid lens module of the camera module according to the first exemplary embodiment of the present invention; FIG. 6 is a plan view (conceptual view) of the liquid lens module of the camera module according to the first exemplary embodiment of the present invention; FIG. 7 is a plan view (conceptual diagram) illustrating some modified examples and related configurations of the liquid lens module of FIG. 6; FIG. 8 is a bottom view (conceptual view) of the configuration illustrated in FIG. 7; FIG. 9 is a plan view (conceptual diagram) illustrating a coil and a related configuration of a camera module according to the first exemplary embodiment of the present invention; FIG. 10 is a bottom view (conceptual view) illustrating a magnet facing the coil of FIG. 9 and a related configuration; FIG. 11 is a plan view (conceptual diagram) illustrating a modified example and the related configuration of the coil of FIG. 9; FIG. 12 is a bottom view (conceptual view) illustrating a magnet facing the coil of FIG. 11 and a related configuration; FIG. 13 is a cross-sectional view (conceptual diagram) illustrating an operating state of the camera module of FIG. 1; FIG. 14 is a cross-sectional view (conceptual view) of a camera module according to a second exemplary embodiment of the present invention; FIG. 15 is a cross-sectional view (conceptual diagram) illustrating an operating state of the camera module of FIG. 14; FIG. 16 is a cross-sectional view (conceptual view) of a camera module according to a third embodiment of the present invention; FIG. 17 is a plan view (conceptual diagram) illustrating a partial configuration of the camera module of FIG. 16; FIG. 18 is a bottom view (conceptual view) of the configuration illustrated in FIG. 17; and FIG. 19 is a cross-sectional view (conceptual view) of a camera module according to a fourth embodiment of the present invention.

However, FIGS. 2, 6, 7, 10, 12, and 18 may comprise modified examples in which the arrangement of the terminal 210 is modified.

The camera module according to the present exemplary embodiment may comprise an OIS structure that compensates for shaking by using a wire 710 or a plate spring 720 in a liquid lens module 200 that performs an auto focus function.

The camera module may comprise a mover 10. The mover 10 can move through interaction with a stator 20. The mover 10 may move during OIS driving. The mover 10 may comprise a housing 100 and a liquid lens module 200.

The camera module may comprise a housing 100. A liquid lens 202 may be disposed in the housing 100. The liquid lens 202 may be coupled to the housing 100. The liquid lens 202 may be fixed to the housing 100. The housing 100 may be disposed in a space formed by a cover 800 and a base 400. The housing 100 may be disposed outside the liquid lens module 200. The housing 100 may comprise a hole 105. The liquid lens module 200 may be disposed in the hole 105 of the housing 100. The housing 100 may be disposed between the cover 800 and the liquid lens module 200. The housing 100 may be formed of a material different from that of the cover 800. The housing 100 may comprise an insulating material. The housing 100 may be formed by injection. The outer side surface of the housing 100 may be spaced apart from the inner surface of a lateral plate 820 of the cover 800. Through the space separating between the housing 100 and the cover 800, the housing 100 may move for OIS driving. A magnet 300 may be disposed in the housing 100. The housing 100 and the magnet 300 may be coupled by an adhesive. In this case, the adhesive may be an epoxy cured by at least one of ultraviolet (UV), heat, and laser.

The housing 100 may comprise four sidewalls and four corners formed between the four sidewalls. The lateral wall of the housing 100 may be 'side portion'. The housing 100 may comprise first to fourth lateral walls 101, 102, 103, and 104. The housing 100 may comprise: a first lateral wall 101; a second lateral wall 102 disposed opposite the first lateral wall 101; and a third lateral wall 103 and a fourth lateral wall 104 which are disposed opposite to each other between the first lateral wall 101 and the second lateral wall 102. The housing 100 may comprise: a first corner where the first lateral wall 101 and the third lateral wall 103 meet; a second corner where the first lateral wall 101 and the fourth lateral wall 104 meet; a third corner where the second lateral wall 102 and the fourth lateral wall 104 meet; and a fourth corner where the second lateral wall 102 and the third lateral wall 103 meet.

The camera module may comprise a connection part. The connection part may connect the liquid lens and at least one wire 710 of the plurality of wires 710. In this case, the liquid lens and a substrate 600 may be electrically connected to the connection part through at least one wire 710. The connection part may comprise the conductive line 110. The connection part may be formed as a conductive line on the surface of the housing 100. The connection part may be formed as a surface electrode or a surface pattern on the surface of the housing 100. The connection part may be a separate terminal using a spring or a plate. The connection part may be electrically connected to an upper electrode 204 and a lower electrode 205 of the liquid lens 202. The connection part may be combined with a terminal 210. The connection part may be integrally formed with the housing 100. The connection part may be formed as a separate member from the housing 100.

The housing 100 may comprise a conductive line 110. The conductive line 110 may be disposed along one surface of the housing 100. The conductive line 110 may be disposed along the upper or lower surface of the housing 100. The conductive line 110 may be disposed along the outer surface or the surface of the housing 100. The conductive line 110 may be formed or printed in a line pattern (line shape) on the surface of the housing 100. The conductive line 110 may be formed through a molded interconnect device (MID) technology. The housing 100 may be injection molded from a material containing impurities whose physical properties are changed when at least one of light and heat is applied. At this time, the conductive line 110 may be a portion of the outer surface of the housing 100 whose physical properties are changed to be electrically conductive by light exposure.

In the first and third exemplary embodiments of the present invention, one end of the conductive line 110 may be connected to the terminal 210 of the liquid lens module 200, and the other end of the conductive line 110 may be connected to the wire 710. The conductive line 110 and the terminal 210 of the liquid lens module 200 may be connected by any one or more of conductive epoxy and solder balls. The conductive line 110 and the wire 710 may be connected by any one or more of conductive epoxy and solder balls. The conductive epoxy may be a silver (Ag) epoxy.

In the second and fourth exemplary embodiments of the present invention, one end of the conductive line 110 may be connected to the terminal 210 of the liquid lens module 200, and the other end of the conductive line 110 may be connected to the plate spring 720. The conductive line 110 and the plate spring 720 may be connected by any one or more of conductive epoxy and solder balls.

In the present exemplary embodiment, since the liquid lens and the wire 710 are connected through the conductive line 110, there is an advantage that the connection process with the terminal 210 of the liquid lens becomes simplified.

The housing 100 may comprise a hole. The wire 710 may be disposed in the hole of the housing 100. The hole may be formed to correspond to the number of wires 710. The hole may comprise a plurality of holes. The hole may comprise four wires and corresponding four holes. The hole of the housing 100 may be a "wire hole". The diameter of the hole may be larger by a predetermined size than the diameter of the wire 710. The hole may penetrate the housing 100 in a vertical direction (optical axis direction). The housing 100 may comprise a groove. The wire 710 may be disposed in the groove of the housing 100. The groove of the housing 100 may replace the hole of the housing 100. The hole or groove in the housing 100 may be formed in corner regions of the housing 100. However, as a modified example, a hole or a groove may be formed in a protrusion protruding from the side surface of the housing 100.

The camera module may comprise a spacer (not shown). The spacer may be disposed between the liquid lens module 200 and the housing 100. The spacer on which the liquid lens module 200 is disposed may be coupled to the housing 100. That is, in a modified example, a fixing member separate from the housing 100 may be added. The spacer may comprise a shape corresponding at least in part to the housing 100. The spacer may comprise, at least in part, a shape corresponding to the liquid lens module 200.

The camera module may comprise a liquid lens module 200. The liquid lens module 200 may be disposed in the housing 100. However, as a modified example, the holder 201 may be omitted and the liquid lens 202 may be directly disposed in the housing 100. The liquid lens module 200 may be disposed inside the housing 100. The liquid lens module 200 may be disposed in the hole 105 of the housing 100. The liquid lens module 200 may perform an auto focus function. The liquid lens module 200 may be electrically connected to the substrate 600 through the wire 710 or the plate spring 720. The liquid lens module 200 may be coupled to the housing 100 by screw coupling. The liquid lens module 200 may be coupled to the housing 100 by a screwless coupling such as a bonding coupling.

The liquid lens module 200 may comprise a holder 201. The holder 201 may accommodate the liquid lens 202 therein. The holder 201 may be disposed outside the liquid lens 202. The holder 201 may be disposed between the liquid lens 202 and the housing 100. The liquid lens 202 may be coupled to the housing 100 through the holder 201. The terminal 210 may be disposed in the holder 201. The liquid lens 202 may be accommodated in the holder 201 and electrically connected to the terminal 210 of the liquid lens 202.

The liquid lens module 200 may comprise a liquid lens 202. First, referring to FIG. 3(a), the liquid lens 202 whose focal length is adjusted in response to the driving voltage may receive an operating voltage through the upper electrode 204. The upper electrode 204 may have the same angular distance and may comprise four individual terminals disposed in different directions. When an operating voltage is applied via the upper electrode 204, an interface surface 203-3 formed between the conductive liquid and the non-conductive liquid in a lens region 203 may be deformed. The upper electrode 204 may be an 'upper terminal'. The lower electrode 205 may be a 'lower terminal'. The liquid lens 202 may be spaced apart from a solid lens 220. In the present exemplary embodiment, an epoxy may be applied through the space separating between the liquid lens 202 and the solid lens 220, and active alignment of the liquid lens 202 may be performed.

Figure 3B:
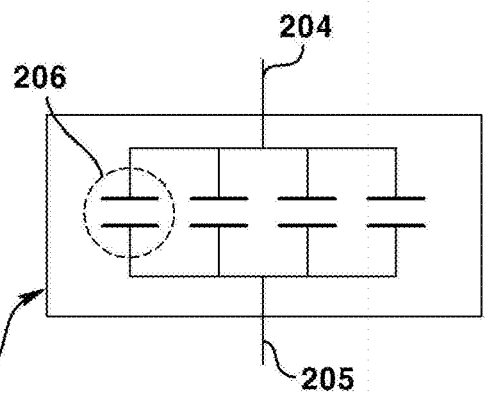

In addition, referring to FIG. 3(b), one side of the liquid lens 202 is applied with an operating voltage from the upper electrodes 204, and the other side may be described with a plurality of capacitors 206 connected to the lower electrode 205. Here, the plurality of capacitors 206 included in the equivalent circuit may have a small capacitance of about 200 pF. In an exemplary embodiment, the upper electrode 204 of the liquid lens 202 may be a separate terminal and the lower electrode 205 may be a common terminal. Alternatively, the upper electrode 204 of the liquid lens 202 may be a common terminal and the lower electrode 205 may be a separate terminal. In the liquid lens 202, the interface surface 203-3 being formed between a conductive liquid 203-1 and a non-conductive liquid 203-2 can be deformed by a current applied to the upper electrode 204 and the lower electrode 205. Through this, the AF function can be performed.

As illustrated in FIG. 4, the liquid lens 202 may comprise a liquid, a first plate 207-1, and an electrode. The liquid lens 202 may comprise a conductive liquid 203-1 and a nonconductive liquid 203-2. The first plate 207-1 may comprise a cavity 209 in which the conductive liquid 203-1 and the non-conductive liquid 203-2 are disposed. The cavity 209 may comprise an inclined surface. The upper electrode 204 and the lower electrode 205 may be disposed on the first plate 207-1. The upper electrode 204 may be disposed above the first plate 207-1. The lower electrode 205 may be disposed below the first plate 207-1. The liquid lens 202 may comprise a second plate 207-2 disposed on the upper electrode 204. In addition, the liquid lens 202 may comprise a third plate 116 that may be disposed under the lower electrode 205. As illustrated, one exemplary embodiment of the liquid lens 202 may comprise an interface surface 203-3 formed by two different liquids. In addition, the liquid lens 202 may be electrically connected to a terminal 210 disposed in the holder 201 to be supplied with a voltage. An edge of the liquid lens 202 may be thinner than a center portion of the liquid lens 202.

The liquid lens 202 may comprise two different liquids, for example, a conductive liquid 203-1 and a non-conductive liquid 203-2. The curvature and a shape of the interface surface 203-3 formed by the two liquids in the liquid lens 202 may be adjusted by a driving voltage supplied to the liquid lens 202. The driving voltage supplied to the liquid lens 202 may be transmitted through the terminal 210. The upper electrode 204 of the liquid lens 202 may be connected to the first terminal 211, and the lower electrode 205 of the liquid lens 202 may be connected to the second terminal 212. The voltage supplied via the terminal 210 may be applied to the upper electrode 204 and the lower electrode 205 exposed at each corner of the liquid lens 202.

The liquid lens 202 may be positioned between a third plate 207-3 and a second plate 207-2 containing a transparent material, and may comprise a first plate 207-1 comprising an opening area having a predetermined inclined surface.

The liquid lens 202 may comprise a cavity 209 determined by an opening area of the third plate 207-3, the second plate 207-2, and the first plate 207-1. Here, the cavity 209 may be filled with the conductive liquid 203-1 and the non-conductive liquid 203-2, and the interface surface 203-3 may be formed between the conductive liquid 203-1 and the non-conductive liquid 203-2.

At least one of the two liquids included in the liquid lens 202 may have conductivity. The liquid lens 202 may comprise an insulating layer 208 disposed on an inclined surface to which the conductive liquid 203-1 may contact. Here, the insulating layer 208 may cover the lower electrode 205 and expose a portion of the upper electrode 204 so that electrical energy can be applied to the conductive liquid 203-1. Here, the lower electrode 205 may comprise at least one electrode sector, and the upper electrode 204 may comprise two or more electrode sectors. For example, the upper electrode 204 may comprise a plurality of electrode sectors that are sequentially disposed in a clockwise direction about the optical axis. The electrode sector may be a 'sub electrode'. Alternatively, the upper electrode 204 may also comprise one electrode sector.

Terminals 210 may be connected for transmitting driving voltages to the upper and lower electrodes 204 and 205 included in the liquid lens 202. The focal length of the liquid lens 202 may be adjusted as the curvature, inclination, and the like of the interface surface 203-3 being formed in the liquid lens 202 change in response to the driving voltage. However, in a modified example, the upper electrode 204 and the lower electrode 205 of the liquid lens 202 may comprise a terminal. That is, the terminal of the upper electrode 204 of the liquid lens 202 may be directly coupled to a conductive line 110 of the housing 100. In addition, the terminal of the lower electrode 205 of the liquid lens 202 may be directly coupled to the conductive line 110 of the housing 100.

The upper and lower electrodes 204 and 205 of the liquid lens 202 may be spaced apart from the housing 100 and connected by a connection part of the housing 100. An upper surface of the liquid lens 202 and an upper surface of the housing 100 may correspond to each other. The upper surface of the liquid lens 202 and the upper surface of the housing 100 may be disposed on one plane. At least a portion of the liquid lens module 200 may protrude upward from an upper surface of the housing 100. A portion of the solid lens 220 of the liquid lens module 200 may be disposed above the upper surface of the housing 100.

The liquid lens module 200 may comprise a lens region 203. The interface surface 203-3 of the lens region 203 of the liquid lens module 200 may vary according to the applied current and/or voltage. According to the change of the interface surface 203-3 of the lens region 203, the degree of refraction of incident light may be changed. Through this, the liquid lens module 200 may perform an auto focus function.

The liquid lens module 200 may comprise a solid lens 220. The liquid lens module 200 may comprise a barrel 230. The solid lens 220 may be accommodated in the barrel 230. The solid lens 220 may be disposed in the barrel 230. The solid lens 220 may be fixed to the inner circumferential surface of the barrel 230. The solid lens 220 may comprise a plurality of lenses. The solid lens 220 may comprise a first group lens comprising at least one lens and a second group lens comprising at least one lens.

In the present embodiment, the liquid lens 202 may be disposed in an add-in manner. The liquid lens 202 may be disposed between the first group lens and the second group lens of the solid lens 220. At this time, the first group lens comprises one or two or more lenses, and the second group lens may comprise one, two or three to four lenses or five or more lenses. The first group lens may be disposed above the liquid lens 202 and the second group lens may be disposed below the liquid lens 202.

As a modified example, the liquid lens 202 may be disposed in an add-on manner. The liquid lens 202 may be disposed on the uppermost lens (outermost lens) of a solid lens 220. The liquid lens 202 may be disposed on an upper surface of a barrel 230. A guide portion such as a protrusion for fixing the liquid lens 202 may be formed on an upper surface of the barrel 230. In addition, a conductive structure of the liquid lens 202 may be formed on the outer surface of the barrel 230.

The liquid lens module 200 may comprise a terminal 210. The terminal 210 is disposed in a holder 201 and may be provided separately from the liquid lens 202. The terminal 210 of the liquid lens module 200 may be connected to the conductive line 110 of the housing 100. The terminal of the liquid lens module 200 may be coupled to the conductive line 110 of the housing 100 by soldering. The terminal 210 may comprise a plurality of terminals. The terminal 210 may comprise a total of two terminals. The terminal 210 may comprise a first terminal 211 and a second terminal 212. The first terminal 211 and the second terminal 212 may be disposed on one surface of the liquid lens module 200 (Refer to FIG. 6, etc.). As illustrated in FIG. 6, the first terminal 211 and the second terminal 212 may be disposed at the same height. Alternatively, the terminal 210*a* of a modified example of FIG. 2 may comprise a first terminal 211*a* and a second terminal 212*a* disposed at different heights. Alternatively, the first terminal 211 may be disposed on one surface of the liquid lens module 200 and the second terminal 212 may be disposed on the other surface of the liquid lens module 200 (a surface disposed opposite to one surface) (Refer to FIGS. 7 and 8, etc.). At this time, the first terminal 211 and the second terminal 212 may be disposed in diagonal directions with each other. The first terminal 211 and the second terminal 212 may be disposed to be symmetrical with respect to the optical axis of the liquid lens module 200. The terminal 210 may comprise a test terminal. The terminal 210 may be formed of three each or more including a test terminal. The terminals 211 and 212 and the conductive line 110 may be coupled by solder balls S or a conductive epoxy.

The liquid lens module 200 may include a support portion for supporting the terminal 210. The support portion of the liquid lens module 200 may support the lower surface of the terminal 210. At least a portion of the lower surface of the support portion may be disposed in the housing 100. At least a portion of the support portion may be overlapped with the housing 100 in a vertical direction (optical axis direction). Through this, when the liquid lens module 200 is seated on the housing 100 from the above, the liquid lens module 200 can be fixed to the housing 100 without falling down.

In the third and fourth exemplary embodiments of the present invention, the liquid lens module 200 may comprise a first liquid lens module 200-1 and a second liquid lens module 200-2. The first liquid lens module 200-1 may comprise a lens region 203 whose interface surface changes according to an applied current and/or voltage. The first liquid lens module 200-1 may be disposed in the housing 100. The second liquid lens module 200-2 may comprise a lens region 203 whose interface surface changes according to an applied current and/or voltage. The second liquid lens module 200-2 may be disposed in the housing 100. The first liquid lens module 200-1 and the second liquid lens module 200-2 may be disposed side by side. The first liquid lens module 200-1 and the second liquid lens module 200-2 may be disposed in parallel. The optical axis of the first liquid lens module 200-1 and the optical axis of the second liquid lens module 200-2 may be parallel to each other. The first liquid lens module 200-1 and the second liquid lens module 200-2 may be in contact with each other. One surface of the first liquid lens module 200-1 may be fixed to one surface of the second liquid lens module 200-2. An adhesive may be disposed between the first liquid lens module 200-1 and the second liquid lens module 200-2. The first liquid lens module 200-1 and the second liquid lens module 200-2 may be formed in a shape corresponding to each other. The first liquid lens module 200-1 and the second liquid lens module 200-2 may be formed in sizes corresponding to each other. Each of the first liquid lens module 200-1 and the second liquid lens module 200-2 may provide an auto focus function. The camera modules according to the third and fourth exemplary embodiments may be 'dual camera modules'.

In the previous exemplary embodiments, each of the first liquid lens module 200-1 and the second liquid lens module 200-2 has two terminals 210, thereby providing a total of four terminals, but in a modified example, one individual electrode may be disposed on each of the first liquid lens module 200-1 and the second liquid lens module 200-2, and only one common electrode may be disposed, thereby providing a total of three terminals. The first liquid lens module 200-1 and the second liquid lens module 200-2 may use individual electrodes separately, and only one common electrode may be used in common. In a modified example, only three conductive lines 110 disposed on the housing 100 may be disposed, and only three wires 710 or plate springs 720 may be disposed.

In another modified example, a housing 100 may comprise two housings spaced apart from each other. In this case, the first liquid lens module 200-1 and the second liquid lens module 200-2 may be disposed in two housings, respectively. Four wires may be connected to each of the two housings.

The camera module may comprise a magnet 300. The magnet 300 may be disposed in the housing 100. The magnet 300 may be disposed in an inner groove of the housing 100. The magnet 300 may be fixed to the housing 100 by an adhesive. The magnet 300 may face a coil 500. The magnet 300 may electromagnetically interact with the coil 500. The magnet 300 may be disposed on the sidewall of the housing 100. At this time, the magnet 300 may be a flat plate magnet having a flat plate shape. As a modified example, the magnet 300 may be disposed at a corner of the housing 100. At this time, the magnet 300 may be a corner magnet having a hexahedral shape whose inner side surface is wider than the outer side surface.

The magnet 300 may comprise a plurality of magnets. The plurality of magnets may comprise four magnets. The four magnets may be disposed on four sidewalls of the housing 100, respectively. The magnet 300 may comprise first to fourth magnets 311, 312, 313, and 314. The magnet 300 may comprise a first magnet 311 disposed on the first lateral wall 101, a second magnet 312 disposed on the second lateral wall 102, and a third 313 magnet disposed on the third lateral wall 103, and the fourth magnet 314 disposed on the fourth lateral wall 104 (Refer to FIG. 10).

A magnet 300 according to a modified example may comprise first to fourth magnets 321, 322, 323, and 324. The four magnets may be disposed at four corners of the housing 100, respectively. The magnet 300 may comprise: a first magnet 321 disposed at a first corner where the first lateral wall 101 and the third lateral wall 103 meet; a second magnet 322 disposed in a second corner where the first lateral wall 101 and the fourth lateral wall 104 meet; a third magnet 323 disposed at a third corner where the second lateral wall 102 and the fourth lateral wall 104 meet; and a fourth magnet 324 disposed at a fourth corner where the second lateral wall 102 and the third lateral wall 103 meet.

The camera module may comprise a stator 20. The stator 20 may be disposed below the mover 10. The stator 20 may movably support the mover 10 through a support member (wire, plate spring, etc.). The stator 20 may move the mover 10. The stator 20 may comprise a base 400, a coil 500, and a substrate 600.

The camera module may comprise a base 400. The base 400 may be spaced apart from the housing 100. The base 400 may be disposed below the housing 100. The base 400 may be disposed below the substrate 600. The substrate 600 may be disposed on the upper surface of the base 400. The base 400 may be coupled with the cover 800. The base 400 may be disposed on a printed circuit board. The base 400 may be coupled to a plate spring 720. The base 400 may comprise a hole corresponding to the lens region 203 of the liquid lens module 200. Base 400 may comprise a stepped portion formed on a side surface. At this time, a lateral plate 820 of the cover 800 may be disposed on the stepped portion of the base 400. A groove may be formed on a side surface of the base 400. A terminal portion 610 of the substrate 600 may be disposed in the groove of the base 400.

The camera module may comprise a coil 500. The coil 500 may face the magnet 300. The coil 500 may electromagnetically interact with the magnet 300. In this case, when a current is supplied to the coil 500 to form a magnetic field around the coil 500, the magnet 300 may move with respect to the coil 500 by the electromagnetic interaction between the coil 500 and the magnet 300. The coil 500 may move the housing 100 and the liquid lens module 200 in a direction perpendicular to the optical axis with respect to the base 400 through electromagnetic interaction with the magnet 300. The coil 500 may be a fine pattern coil (FP coil) formed integrally with the substrate 600. The coil 500 may comprise a first coil unit for moving the magnet 300 in a first direction, and a second coil unit for moving the magnet 300 in a second direction perpendicular to the first direction.

The coil 500 may comprise a plurality of coils. The plurality of coils may comprise four coils. The coil 500 may comprise first to fourth coils 511, 512, 513, and 514. The coil 500 may comprise: a first coil 511 facing the first magnet 311; a second coil 512 facing the second magnet 312; a third coil 513 facing the third magnet 313; and a fourth coil 514 facing the fourth magnet 314 (Refer to FIG. 9). At this time, the first coil 511 and the second coil 512 may be a first coil unit for moving the magnet 300 in the first direction, and the third coil 513 and the fourth coil 514 may be a second coil unit that move the magnet 300 in the second direction.

The coil 500 according to a modified example may comprise first to fourth coils 521, 522, 523, and 524. The coil 500 may comprise: a first coil 521 facing the first magnet 321; a second coil 522 facing the second magnet 322; a third coil 523 facing the third magnet 323; and a fourth coil 524 facing the fourth magnet 324 (Refer to FIG. 11). At this time, the first coil 521 and the third coil 523 may be a first coil unit for moving the magnet 300 in the first direction, and the second coil 522 and the fourth coil 524 may be a second coil unit for moving the magnet 300 in the second direction.

The camera module may comprise a substrate 600. The substrate 600 may be disposed on the base 400. The substrate 600 may be disposed between the housing 100 and the base 400. The substrate 600 may be electrically connected to the coil 500. The substrate 600 may be electrically connected to the liquid lens module 200. The substrate 600 may be electrically connected to an external power source. The substrate 600 may comprise a flexible printed circuit board (FPCB). The substrate 600 may be bent in some portion thereof. A first Hall sensor and a second Hall sensor may be mounted on the lower surface of the substrate 600.

The substrate 600 may comprise a first hole 601 corresponding to the lens region 203 of the liquid lens module 200. The first hole 601 may be formed to penetrate the central portion of the substrate 600 in the optical axis direction. Light passing through the lens region 203 of the liquid lens module 200 through the first hole 601 may be incident to an image sensor.

The substrate 600 may comprise a second hole 602 through which the wire 710 passes. The diameter of the second hole 602 may correspond to or slightly larger than the diameter of the wire 710. The lower end of the wire 710 passing through the second hole 602 may be coupled to the lower surface of the substrate 600 by soldering. The second hole 602 may comprise a plurality of holes. The second hole 602 may be formed in a number corresponding to the wires 710. The second hole 602 may be formed at four corner portions of the substrate 600, respectively.

The substrate 600 may comprise a coil 500. In more detail, the substrate 600 may be a flexible printed circuit board (FPCB) and the coil 500 may be a fine pattern coil (FP coil) coupled to the FPCB. The coil 500 may be a separate component from the substrate 600. Alternatively, the coil 500 may be one component of the substrate 600. At this time, the coil 500 may be formed of an FP coil in a layer added to the substrate 600.

The substrate 600 may comprise a body portion and a terminal portion 610 extending downward from both sides of the body portion. The terminal portion 610 may extend along the side of the base 400. The terminal portion 610 may extend below the lower surface of the base 400. That is, the lower end of the terminal portion 610 may be disposed below the lower end of the base 400. The terminal portion 610 may be formed on both sides of the body portion of the substrate 600. A plurality of terminals may be disposed in the terminal portion 610. Seven terminals may be disposed in each of the two terminal portions 610. Alternatively, six terminals may be disposed in one terminal portion 610 and eight terminals may be disposed in the other terminal portion 610. However, it is not limited thereto.

The substrate 600 may comprise a plurality of terminals. The plurality of terminals of the substrate 600 may comprise: two terminals electrically connected to the liquid lens module 200; two terminals electrically connected to the first coil 511 and the second coil 512; two terminals electrically connected to the third coil 513 and the fourth coil 514; four terminals electrically connected to the first Hall sensor; and four terminals electrically connected to the second Hall sensor. That is, the plurality of terminals may comprise a total of fourteen terminals. In this case, the first to fourth coils 511, 512, 513, and 514 may be replaced with the first to fourth coils 521, 522, 523, and 524 of a modified example.

As a modified example, the terminals electrically connected to the first to fourth coils 511, 512, 513, and 514, the first Hall sensor, and the second Hall sensor may be disposed in the terminal portion 610 of the substrate 600, and the terminals electrically connected to the liquid lens module 200 may be disposed as separate terminals.

The camera module may comprise a support member. The support member may be coupled to the housing 100 and the substrate 600 or the housing 100 and the base 400. The support member may moveably support the housing 100. The support member may elastically support the housing 100. The support member may have elasticity at least in part. The support member may be an 'OIS support member'. The support member may comprise a wire 710 and a plate spring 720. Hereinafter, the wire 710 and the plate spring 720 will be described by different embodiments, but as a modified example, the wire 710 and the plate spring 720 may be used together.

The camera module according to the third and fourth exemplary embodiments of the present invention may comprise a first support member and a second support member. The first support member and the second support member may connect the housing 100 and the substrate 600. The first liquid lens module 200-1, the first support member, and the substrate 600 may be electrically connected to each other. The second liquid lens module 200-2, the second support member, and the substrate 600 may be electrically connected to each other. That is, the first support member may be used as the conductive line of the first liquid lens module 200-1, and the second support member may be used as the conductive line of the second liquid lens module 200-2.

The camera module according to the first and third exemplary embodiments of the present invention may comprise a wire 710. The wire 710 may be connected to the housing 100 and the substrate 600. The upper end portion of the wire 710 may be fixed to the housing 100. The upper end portion of the wire 710 may be coupled to the conductive line 110 of the housing 100 by soldering. The wire 710 may penetrate the housing 100. The wire 710 may pass through the hole of the housing 100. The upper end portion of the wire 710 may be connected to the conductive line 110 of the housing 100 by a conductive epoxy. The wire 710 may pass through the second hole 602 of the substrate 600. The lower end portion of the wire 710 may be fixed to the substrate 600. The lower end portion of the wire 710 may be coupled to the lower surface of the substrate 600 by soldering. The lower end portion of the wire 710 may be connected to the lower surface of the substrate 600 by a conductive epoxy.

The wire 710 may comprise a plurality of wires. The wire 710 may comprise a total of four wires. The plurality of wires 710 may comprise: a first wire 711 connected to the first terminal 211 of the liquid lens module 200; and a second wire 712 connected to the second terminal 212 of the liquid lens module 200. At this time, the first wire 711 and the second wire 712 may be disposed to be symmetrical about the liquid lens. Alternatively, the first wire 711 and the second wire 712 may be disposed to be asymmetrical about the liquid lens. The first wire 711 may be disposed at a position adjacent to the second wire 712. The wire 710 may comprise first to fourth wires 711, 712, 713, and 714. The first to fourth wires 711, 712, 713, and 714 may be disposed at four corners of the housing 100, respectively. In the first and third exemplary embodiments of the present invention, the liquid lens module 200, the wire 710, and the substrate 600 may be electrically connected to each other.

The camera module according to the second and fourth exemplary embodiments of the present invention may comprise a plate spring 720. The plate spring 720 may comprise a plurality of plate springs. The plate spring 720 may comprise a total of four plate springs. The plate spring 720 comprises a first plate spring connected to the first terminal 211 of the liquid lens module 200 and a second plate spring connected to the second terminal 212 of the liquid lens module 200. The four plate springs may be disposed on four side surfaces of the housing 100, respectively. In the second and fourth exemplary embodiments of the present invention, the liquid lens module 200, the plate spring 720, and the substrate 600 may be electrically connected to each other. In FIG. 19, the plate spring 720 is seen in a zigzag form from the side, but the plate spring 720 may be in the shape of a plate (straight). The plate spring 720 may be coupled to the side surface of the housing 100 and the substrate 600 to be electrically connected to each other. A portion (or one end, etc.) of the plate spring 720 may be connected to a connection part (conductive line, etc.) formed in the housing 100 by solder or conductive epoxy (silver epoxy). In this case, the connection part (conduction line, etc.) is formed only on the upper surface of the housing 100, the plate spring 720 may comprise a portion bent toward the upper surface of the housing 100 in some portion thereof, the bent portion of the plate spring 720 may be electrically connected to the upper surface of the housing 100. Or, without a bent portion in the plate spring 720, a portion of the plate spring 720 and the upper surface of the housing 100 may be electrically connected by a separate member. Alternatively, the connection part (conductive line, etc.) is formed to the upper surface and side surface (some portion thereof) of the housing 100, and some portion of the plate spring 720 may be electrically connected to the liquid lens 202 through the side surface of the housing 100.

The camera module may comprise a cover 800. The cover 800 may be combined with the base 400. The cover 800 can accommodate the housing 100 therein. The cover 800 may form an appearance of the camera module. The cover 800 may have a hexahedron shape with a lower surface opened. The cover 800 may be a nonmagnetic material. The cover 800 may be formed of a metal material. The cover 800 may be formed of a metal plate. The cover 800 may be connected to the ground portion of the printed circuit board. Through this, the cover 800 may be grounded. The cover 800 may block electromagnetic interference (EMI). In this case, the cover 800 may be referred to as an 'EMI shield can'.

The cover 800 may comprise an upper plate 810 and a lateral plate 820. The cover 800 may comprise: a top plate 810 comprising a hole; and a lateral plate 820 extending downward from the edge or outer periphery of the upper plate 810 and coupled to the base 400. The inner surface of the lateral plate 820 of the cover 800 may be coupled to the base 400 by an adhesive. The upper plate 810 may comprise a hole. At least a portion of the lens region 203 of the liquid lens module 200 may be exposed through the hole of the upper plate 810. The lateral plate 820 may comprise a plurality of lateral plates. The lateral plate 820 may comprise four lateral plates.

The camera module may comprise a first Hall sensor. The first Hall sensor may be disposed on the substrate 600. The first Hall sensor may face the first magnet 311 or the second magnet 312 (Refer to FIG. 10). In a modified example, the first Hall sensor may face the first magnet 321 or the third magnet 323 (Refer to FIG. 12). The first Hall sensor may detect the magnetic force of the opposing magnet to detect the position and/or the movement amount of the magnet 300 according to the movement in the first axis direction of the magnet 300. Since the magnet 300 is fixed to the housing 100 and the liquid lens module 200 is also fixed to the housing 100, the first Hall sensor detects the position and/or movement amount of the magnet 300, and thereby the position and/or the movement amount of the housing 100 and the liquid lens module 200 may also be detected. Meanwhile, the 'first axis direction' may be the 'x axis direction'.

The camera module may comprise a second Hall sensor. The second hall sensor may be disposed on the substrate 600. The second hall sensor may face the third magnet 313 or the fourth magnet 314 (Refer to FIG. 10). In a modified example, the second Hall sensor may face the second magnet 322 or the fourth magnet 324 (Refer to FIG. 12). The second Hall sensor may detect the magnetic force of the opposing magnet according to the movement of the magnet 300 in the second axis direction, and thereby the position and/or movement amount of the magnet 300 may be detected. Since the magnet 300 is fixed to the housing 100 and the liquid lens module 200 is also fixed to the housing 100, the second Hall sensor detects the position and/or movement amount of the magnet 300, and thereby the position and/or the movement amount of the housing 100 and the liquid lens module 200 may also be detected. Meanwhile, the second axis direction may be perpendicular to the first axis direction. The 'second axis direction' may be a 'y axis direction'.

The camera module may comprise a filter. The filter may comprise an infrared filter. The infrared filter may block the light of the infrared region from being incident on the image sensor. The infrared filter may be disposed between the liquid lens module 200 and the image sensor. The infrared filter may be disposed in the hole of the base 400.

The camera module may comprise a printed circuit board. The base 400 may be disposed on the printed circuit board. However, a separate sensor base may be disposed between the printed circuit board and the base 400. The printed circuit board may be electrically connected to the terminal portion 610 of the substrate 600. An image sensor may be disposed on the printed circuit board. The printed circuit board may be electrically connected to the image sensor.

The camera module may comprise an image sensor. The image sensor may be disposed on the printed circuit board. The image sensor may be electrically connected to the printed circuit board. As an example, the image sensor may be coupled to a printed circuit board by surface mounting technology (SMT). As another example, the image sensor may be coupled to the printed circuit board by flip chip technology. The image sensor may be disposed in a way that the axis of the lens and the optical axis coincide. That is, the optical axis of the image sensor and the optical axis of the lens region 203 may be aligned. The image sensor may convert light irradiated to the effective image area of the image sensor into an electrical signal. The image sensor may be any one of a charge coupled device (CCD), a metal oxide semiconductor (MOS), a CPD, and a CID.

The camera module may comprise a control unit. The control unit may be disposed on the printed circuit board. The control unit may control the direction, intensity and amplitude of the current supplied to the liquid lens module 200 and/or the coil 500. The control unit may provide an image stabilization function. The control unit may perform feedback control for image stabilization through the first and second Hall sensors.

In the above description, all components constituting the embodiments of the present invention are described as being combined or operating in combination, but the present invention is not necessarily limited to the embodiments. In other words, within the scope of the purpose of this invention, all of those components may operate in selective combinations of one or more components. In addition, the term "include", "comprise", or "have" described above means that the corresponding components can be embedded unless there is an opposite description therefore it should be interpreted that other components may further be comprised in addition to those corresponding components. All terms, including technical and scientific terms, have the same meaning as commonly understood by one of ordinary skill in the art to which this invention belongs, unless otherwise defined. Commonly used terms, such as predefined terms, should be interpreted to be consistent with the contextual meanings of the related art, and are not to be construed as ideal or excessively formalistic, unless expressly defined to the contrary.

The above description is only to those described as the technical idea of the present invention by way of example, and those skilled in the art will appreciate that various modifications and variations can be made without departing from the essential features of the present invention. Therefore, the embodiments disclosed in the present invention are not intended to limit the technical idea of the present invention but to describe the present invention, and the scope of the technical idea of the present invention is not limited by these embodiments. The protection scope of the present invention should be interpreted by the following claims, and all technical ideas within the equivalent scope should be interpreted as being included in the scope of the present invention.

The invention claimed is:

1. A camera module comprising:
   a housing;
   a liquid lens disposed on the housing;
   a magnet disposed on the housing;
   a base disposed to be spaced apart from the housing;
   a substrate disposed on the base and comprising a coil disposed at a position corresponding to that of the magnet;
   a plurality of wires connected to the housing and the substrate;
   a printed circuit board electrically connected to the substrate; and
   a connection part connecting the liquid lens and at least one wire of the plurality of wires,
   wherein the liquid lens and the substrate are electrically connected to each other through the connection part and the at least one wire,
   wherein the housing comprises a first lateral wall, a second lateral wall disposed opposite to the first lateral wall, and a third lateral wall and a fourth lateral wall disposed opposite to each other between the first lateral wall and the second lateral wall,
   wherein the magnet comprises a first magnet disposed on the first lateral wall, a second magnet disposed on the second lateral wall, a third magnet disposed on the third lateral wall, and a fourth magnet disposed on the fourth lateral wall,
   wherein the coil of the substrate comprises a first coil facing the first magnet, a second coil facing the second magnet, a third coil facing the third magnet, and a fourth coil facing the fourth magnet,
   wherein a first Hall sensor is disposed on the substrate at a position corresponding to that of the first magnet or that of the second magnet;
   wherein a second Hall sensor is disposed on the substrate at a position corresponding to that of the third magnet or that of the fourth magnet,
   wherein the substrate comprises a plurality of terminals, and
   wherein the plurality of terminals of the substrate comprise a terminal electrically connected to the liquid lens, a terminal electrically connected to the first coil and the second coil, a terminal electrically connected to the third coil and the fourth coil, a terminal electrically connected to the first Hall sensor, and a terminal electrically connected to the second Hall sensor.

2. The camera module of claim 1, wherein the connection part comprises a conductive line disposed on one surface of the housing,
   wherein one end portion of the conductive line is connected to a terminal of the liquid lens, and
   wherein the other end portion of the conductive line is connected to the at least one wire.

3. The camera module of claim 2, wherein the conductive line is printed or formed in a line shape on a surface of the housing, and
   wherein the conductive line and the terminal of the liquid lens, and the conductive line and the wire are connected by at least any one of a conductive epoxy and a solder ball.

4. The camera module of claim 1, wherein the liquid lens comprises a first terminal and a second terminal, and
wherein the plurality of wires comprise a first wire connected to the first terminal of the liquid lens and a second wire connected to the second terminal of the liquid lens.

5. The camera module of claim 1, wherein the housing comprises a first lateral wall, a second lateral wall disposed opposite to the first lateral wall, and a third lateral wall and a fourth lateral wall disposed opposite to each other between the first lateral wall and the second lateral wall,
wherein the magnet comprises a first magnet disposed at a first corner where the first lateral wall and the third lateral wall meet, a second magnet disposed at a second corner where the first lateral wall and the fourth lateral wall meet, a third magnet disposed at a third corner where the second lateral wall and the fourth lateral wall meet, and a fourth magnet disposed in a fourth corner where the second lateral wall and the third lateral wall meet, and
wherein the coil of the substrate comprises a first coil facing the first magnet, a second coil facing the second magnet, a third coil facing the third magnet, and a fourth coil facing the fourth magnet.

6. The camera module of claim 1, comprising:
a cover comprising an upper plate comprising a hole and a lateral plate extending from the upper plate and coupled to the base,
wherein the housing is disposed in a space formed by the cover and the base.

7. The camera module of claim 1, wherein the connection part is formed on a surface of the housing as a conductive line.

8. The camera module of claim 7, wherein the conductive line is formed by a material different from that of the housing.

9. The camera module of claim 1, wherein the plurality of terminals of the substrate comprise a total of fourteen terminals, and
wherein the fourteen terminals comprise two terminals electrically connected to the liquid lens, two terminals electrically connected to the first coil and the second coil, two terminals electrically connected to the third coil and the fourth coil, four terminals electrically connected to the first hall sensor, and four terminals electrically connected to the second Hall sensor.

10. The camera module of claim 1, comprising a holder disposed between the housing and the liquid lens,
wherein the liquid lens comprises a first electrode formed on an upper surface of the liquid lens and a second electrode formed on a lower surface of the liquid lens, and
wherein the holder is provided with a first terminal connecting the first electrode and the connecting part, and a second terminal connecting the second electrode and the connection part.

11. The camera module of claim 1, wherein the liquid lens is fixed to the housing.

12. The camera module of claim 1, wherein the connection part comprises a spring or a plate coupled to the housing.

13. An optical apparatus comprising:
a main body;
the camera module of claim 1 disposed on the main body; and
a display disposed on the main body and configured to output an image photographed by the camera module.

14. The camera module of claim 1, wherein the housing and the liquid lens are configured to move together in a direction perpendicular to an optical axis by an interaction between the coil and the magnet when a current is supplied to the coil.

15. The camera module of claim 1, wherein the liquid lens is configured to perform an auto focus function.

* * * * *